United States Patent [19]

Lindberg

[11] 4,373,143

[45] Feb. 8, 1983

[54] PARAMETRIC DUAL MODE TRANSDUCER

[75] Inventor: Jan F. Lindberg, Norwich, Conn.

[73] Assignee: The United States of America as represented by the Secretary of the Navy, Washington, D.C.

[21] Appl. No.: 193,684

[22] Filed: Oct. 3, 1980

[51] Int. Cl.³ .......... H04B 13/00

[52] U.S. Cl. .......... 310/334; 367/155; 367/158; 310/337

[58] Field of Search .......... 310/325, 334, 337; 367/153, 155, 157, 158

[56] References Cited

U.S. PATENT DOCUMENTS

| | | | |
|---|---|---|---|
| 2,746,026 | 5/1956 | Camp | 367/157 |
| 3,284,761 | 11/1966 | Douglas | 367/155 |
| 3,329,408 | 7/1967 | Branson | 310/334 |
| 3,952,216 | 4/1976 | Madison et al. | 367/155 |

*Primary Examiner*—J. D. Miller

*Assistant Examiner*—D. L. Rebsch

*Attorney, Agent, or Firm*—Robert F. Beers; Arthur A. McGill

[57] ABSTRACT

A dual mode transducer has the capability of high power active transmission at two separate frequencies more than two octaves apart with broad bandwidth at both frequencies. The low frequency transducer is a standard double mass loaded longitudinal vibrator which has a head mass composed of a small array of high frequency transducers. The high frequency transducers are either half-wave resonators or tonpilz types. These high frequency transducers have a nodal plate mounting. The head mass of the low frequency transducer has a plurality of apertures which accept the high frequency transducers. The rear of each high frequency transducer is recessed into an aperture and has air as an acoustic pressure release. Both low and high frequency transducers form part of an electrically steerable array.

8 Claims, 4 Drawing Figures

PARAMETRIC DUAL MODE TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Traditionally when both the linear and nonlinear signal of the same frequency is required in a transducer, two separate transducers are utilized. An applicable transducer device uses two separate transducers to produce the linear and nonlinear signals. However, since the parametric pump frequencies utilized are quite high, the high frequency array is small and is located directly in front of the low frequency array. A problem in the design is the difficulty in making the high frequency transducer very small in order to be acoustically transparent to the linear transducer array.

An alternate system using a similar arrangement attempts to get around this problem by separating the high and low frequency transducer with a pressure-release sheet. In theory the sheet is rigid at low frequency operation so that the high frequency transducer vibrates in unison with the low frequency transducer. At high frequency operation the sheet decouples the transducers so that only the high frequency transducers vibrates. A drawback to this system is the difficulty in obtaining a suitable pressure-release sheet.

Another approach to the problem has been developed and utilizes an impedance matching stub on the face of the radiator to generate a second resonance. It has been standard practice in the past to add a quarter wave stub of an appropriate material on the face of a transducer to broaden the mechanical Q of the transducer. What this design has done is exploit the resonance of this stub to produce a higher frequency transmitting band. The disadvantage of this method is that the separation of the two resonances is generally limited to 1 to 2 octaves and as the separation increases, the bandwidth about the resonances decreases.

SUMMARY OF THE INVENTION

The present invention provides a single compact transducer unit for use underwater, capable of high power transmission at two separate frequency bands more than two octaves apart. The transducer unit is excited at a lower frequency resonance for producing, via linear acoustics, a high powered signal in the medium with standard beamwidth. The transducer unit is also excited at its higher resonance with a parametric signal and produces a difference frequency which is identical in frequency to the lower resonance but with a very narrow beamwidth.

A unit has a plurality of high frequency transducers nodally mounted to the low frequency transducer head. At low frequency operation the low frequency transducer is vibrated. At this time the high frequency moves in unison with the low frequency transducer. In the parametric mode of operation the the high frequency transducer becomes a nodally mounted longitudinal vibrator. This can be achieved with either a half-wave resonator or a tonpilz transducer. In operation the head mass and tail mass radiate out of phase with the nodal mount remaining substantially stationary or to be more precise at the velocity minimum.

DESCRIPTION OF THE PREFERRED EMBODIMENT

Figure 1A:
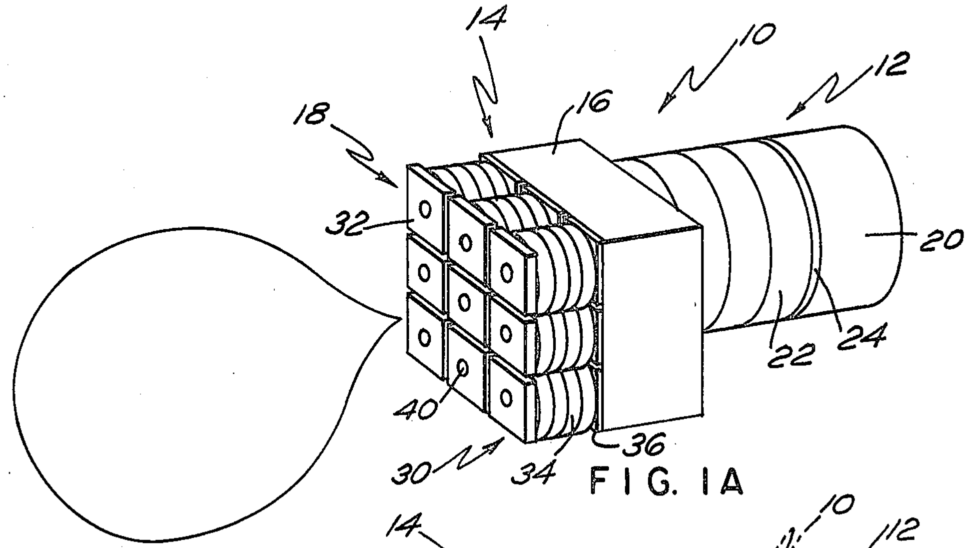
FIG. 1A illustrates the low frequency operation of the dual mode transducer in accordance with the present invention.
Figure 1B:
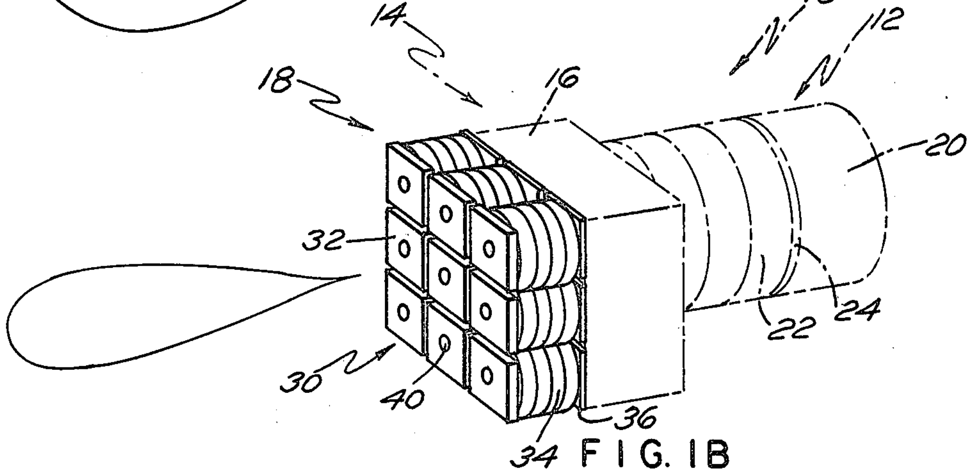
FIG. 1B illustrates the high frequency operation of the dual mode transducer in accordance with the present invention.

Referring now to FIGS. 1A and 1B there is shown a depiction of the dual mode parametric transducer 10 illustrating its different modes of operation. The dual mode transducer 10 comprises a low frequency linear tonpilz longitudinal vibrator 12. In FIG. 1A a head mass 14 is located at one end of vibrator 12. In low frequency operation the head mass 14 includes a magnesium block 16 and a high frequency nonlinear transducer array 18. The transducer array 18 is mounted to magnesium block 16. FIG. 1A shows low frequency operation in which the entire assembly is excited in the normal function. FIG. 1B shows high frequency operation in which only the high frequency nonlinear transducer array 18 is excited. In other words, the low frequency linear tonpilz longitudinal vibrator 12 is made up of the entire dual mode transducer 10, but the high frequency nonlinear transducer array 18 forms only a portion of the dual mode transducer 10.

Figure 2:
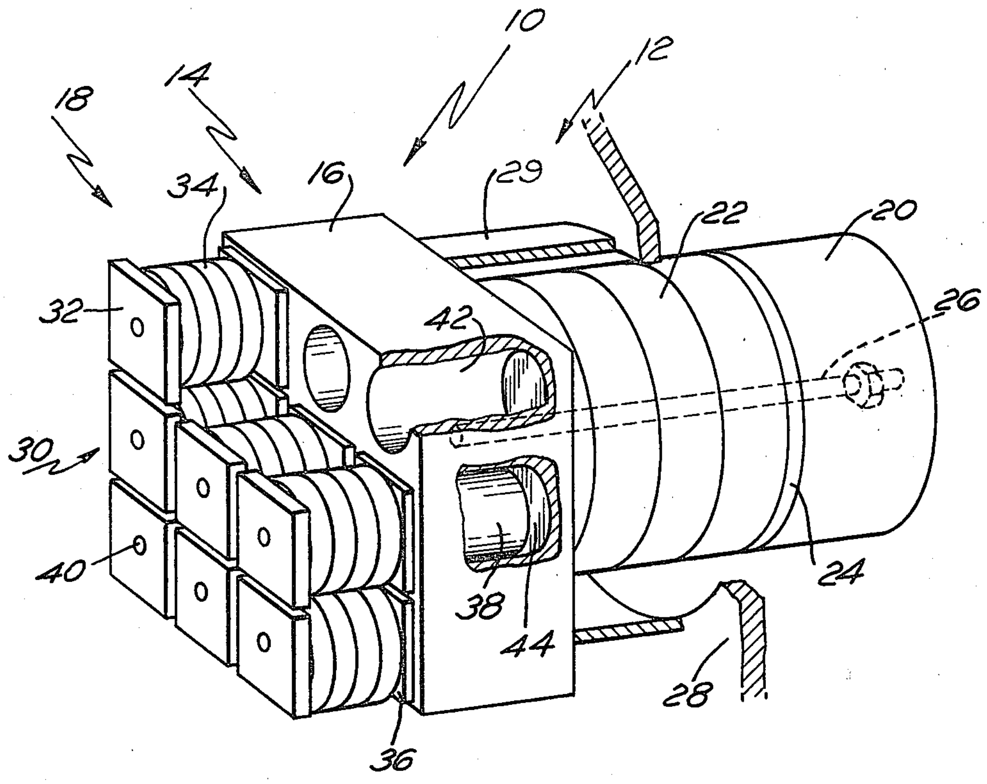
FIG. 2 is a partially sectioned view of the dual mode transducer in accordance with the present invention shown in more detail.

Referring now to FIG. 2 there is shown a more detailed view of the dual mode transducer 10. The low frequency linear tonpilz longitudinal vibrator 12 includes, in addition to head mass 14, a tungsten tail mass 20 and piezoelectric ceramic rings 22. Insulation rings 24 separate the ceramic rings 22 from the tail mass 20 and the magnesium block 16 of head mass 14. A berylliumcopper stress rod 26 connects through the vibrator 12 from the tail mass 20 to the block 16 and applies compression to ceramic rings 22. The transducer 10 is mounted to the array bulkhead 28 by means of a syntactic foam pressure release ring 29.

The high frequency nonlinear transducer array 18 has a plurality of high frequency transducers 30 and each transducer 30 is a half-wave resonator or tonpilz design. The transducers 30 each have an aluminum head mass 32, piezoelectric ceramic rings 34, aluminum nodal mount 36, aluminum tail 38 and stress rod 40 for connecting the components together and placing a stress on ceramic rings 34. The magnesium head mass 16 has a plurality of apertures 42. Each of the aluminum tails 38 is inserted in one of the apertures 42. The pressure release for the high frequency transducers 30 is air and is obtained by forming an air cavity 44 in the rear of aperture 42 by the insertion of aluminum tail 38.

The transducer 10 shown is one of a plurality of transducers 10 that are mounted to bulkhead 28 to form a steerable array in both high and low frequency operations. By way of example, low frequency operation is at 15 kHz and high frequeny parametric operation is at 65 kHz and 80 kHz.

Figure 3:
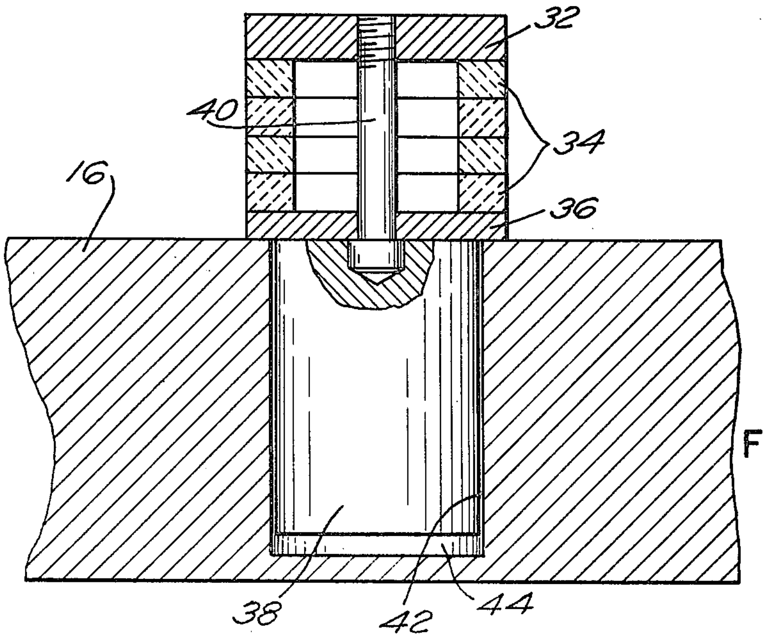
FIG. 3 is an enlarged view of the high frequency transducer in accordance with the present invention.

FIG. 3 is an enlarged view of a high frequency transducer 30 and its associated nodal mounting. When operating in the parametric mode the aluminum head mass 32 and aluminum tail mass 38 vibrate out of phase with each other, leaving aluminum nodal mount 36 at a velocity minimum.

A design feature is the ability of each transducer 12 and 30 in dual mode transducer 10 to operate separately and efficiently without adversely affecting the other transducer. This is accomplished by designing the high frequency transducer 30 to be nodally mounted with a rigid connection. In considering the design of the high frequency transducer 30, three types of transducers were considered: the quarter-wave resonator, the half-wave resonator, and the tonpilz. Initially the quarter-wave resonator appears to be ideal. One simply makes the head mass of the low frequency transducer a group of quarter-wave ceramic resonators and thus when the low frequency transducer is excited, the low frequency transducer sees the high frequency ceramic head mass assembly as simply a solid mass and thus is very appropriate to transmit the acoustic energy into the medium. Unfortunately, the high frequency operation is far from simplistic. The quarter-wave transducer operates in its natural mode based on the transducer being placed on a backing which either exhibits an infinite impedance to the transducer or itself is a quarter wavelength thick in the frequency band of interest. What the quarter-wave resonator sees is the remainder of the low frequency transducer in its own acoustically isolated structure and it is neither a quarter wavelength thick nor an infinite impedance. The half-wave resonator requires acoustic isolation at its tail to function in that mode. If one installs this type transducer as the head mass of the low frequency transducer and further places an acoustic isolation mechanism at its tail, one effectively acoustically shorts out the low frequency transducer. One ends up with a very large impedance mismatch between the low frequency head mass including the half-wave transducers and the tonpilz ceramic driver. The device does not work well. One approach to improve performance is to utilize an acoustic isolation mechanism which is rigid at low frequencies and looks like a pressure release at the higher frequencies. Computer simulation of a mechanism which appeared to have the correct compliance characteristics produced disastrous results and that approach was dropped. At this point in the development, the present transducer was conceived.

There has therefore been described a transducer unit operable in an underwater medium having two separate transducers operating at the same frequency with different bandwidths. The first transducer utilizes a low frequency and provides a broad bandwidth. The second transducer is nodally mounted to the first transducer. The second transducer utilizes a pair of higher frequencies that mix in the water forming a narrow beamwidth at the difference frequency. This difference frequency is the same frequency as the low frequency.

It will be understood that various changes in details, materials, steps and arrangement of parts, which have been herein described and illustrated in order to explain the nature of the invention may be made by those skilled in the art within the principle and scope of the invention as expressed in the appended claims.

What is claimed is:

1. A parametric dual mode transducer comprising:
first transducer means for converting an applied signal of a predetermined frequency; and
second transducer means for converting two applied signals having a difference frequency substantially the same as said predetermined frequency, said second transducer means being nodally mounted to said first transducer means.

2. A parametric dual mode transducer according to claim 1 wherein said second transducer means forms a part of said first transducer means.

3. A parametric dual mode transducer according to claim 2 further comprising:
said first transducer means having a head including a block with a plurality of apertures; and
said second transducer means having a plurality of transducers with each of said transducers having a nodal plate mounted to said first transducer means block and each of said transducers having a tail section inserted in a corresponding aperture of said first transducer means block.

4. A parametric dual mode transducer according to claim 3 wherein a cavity is formed within each of said first transducer means apertures between said first transducer means head and said second transducer means tail section.

5. A parametric dual mode transducer according to claim 4 wherein said second transducer means is an array of half-wave resonators.

6. A parametric dual mode transducer according to claim 4 wherein said second transducer means is an array of tonpilz transducers.

7. A parametric dual mode transducer comprising:
a low frequency linear tonpilz longitudinal vibrator having a head mass, a tail mass, piezoelectric ceramic rings located intermediate said head mass and said tail mass, insulation rings separating said ceramic rings from said head mass and said tail mass, a stress rod connected from said head mass to said tail mass; and
a plurality of high frequency transducers with each of said plurality of high frequency transducers having a nodal mount rigidly connected to a part of said low frequency linear tonpilz longitudinal vibrator head mass.

8. A low frequency linear tonpilz longitudinal vibrator comprising:
a head mass including a block having a plurality of apertures, and a plurality of high frequency transducers with each of said high frequency transducers having a nodal plate mounted to said block and each of said transducers having a tail section inserted in a corresponding aperture of said block to form corresponding cavities;
a tail mass;
piezoelectric ceramic rings located intermediate said head mass and said tail mass;
insulation rings separating said ceramic rings from said head mass and said tail mass; and
a stress rod connected from said block of said head mass to said tail mass.

* * * * *